(No Model.) 4 Sheets—Sheet 1.
A. W. BILLINGS.
APPARATUS FOR THE MANUFACTURE OF BEER.
No. 324,523. Patented Aug. 18, 1885.
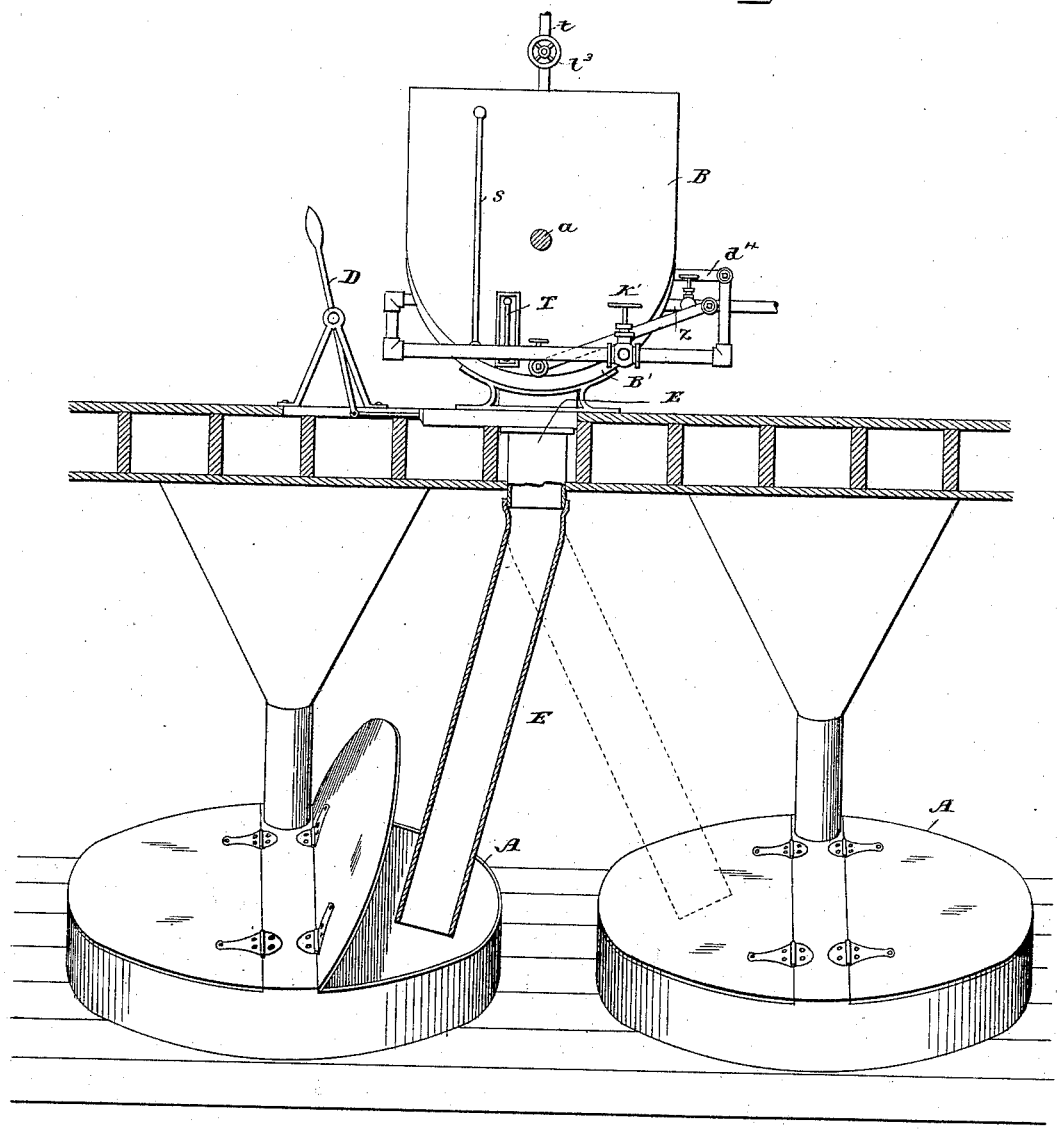

(No Model.) 4 Sheets—Sheet 2.
A. W. BILLINGS.
APPARATUS FOR THE MANUFACTURE OF BEER.
No. 324,523. Patented Aug. 18, 1885.
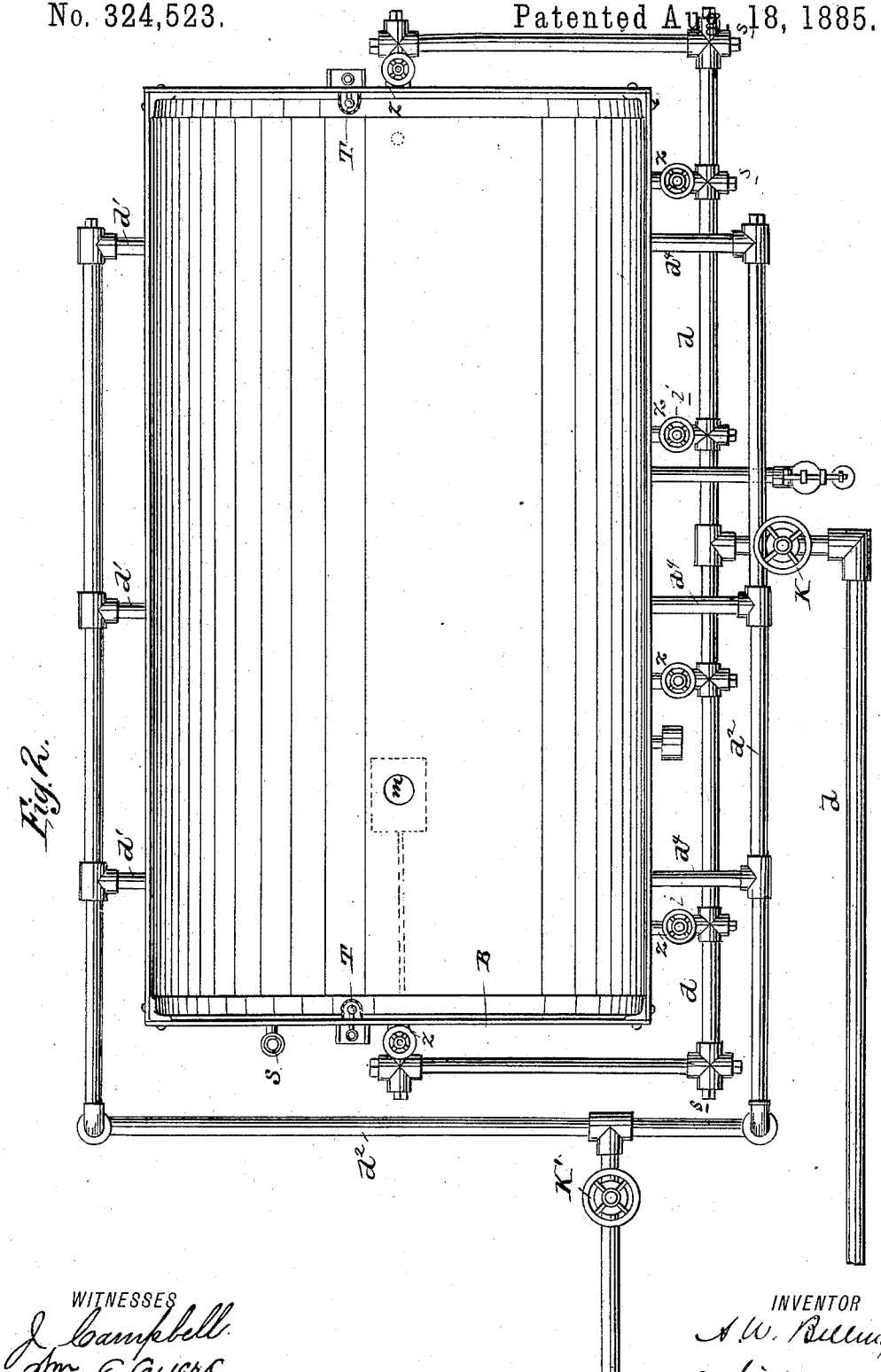
WITNESSES
J. Campbell
Wm. J. Sayers.
INVENTOR
A. W. Billings
By his Attorneys
Foster & Freeman

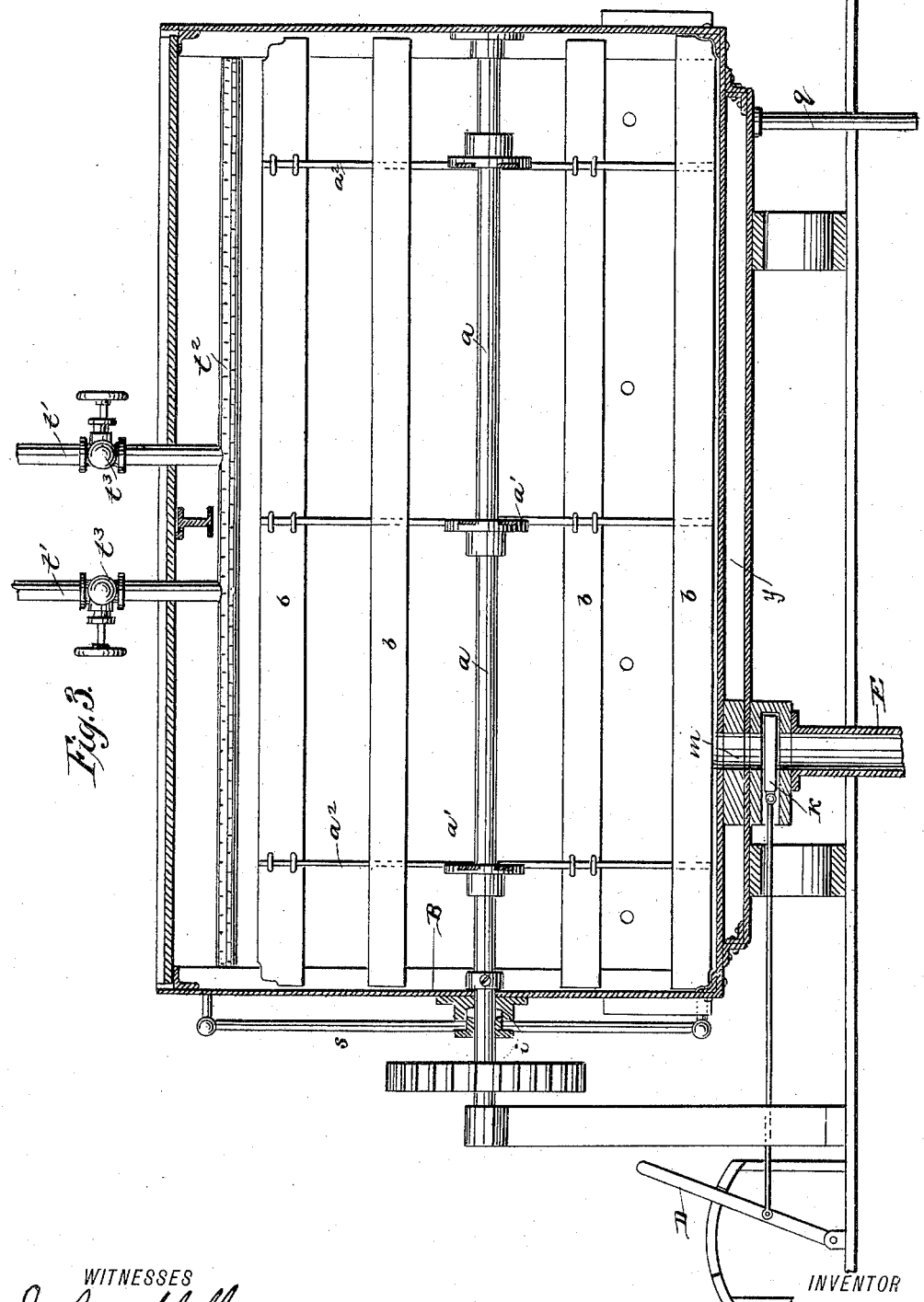

(No Model.) 4 Sheets—Sheet 4.
A. W. BILLINGS.
APPARATUS FOR THE MANUFACTURE OF BEER.
No. 324,523. Patented Aug. 18, 1885.
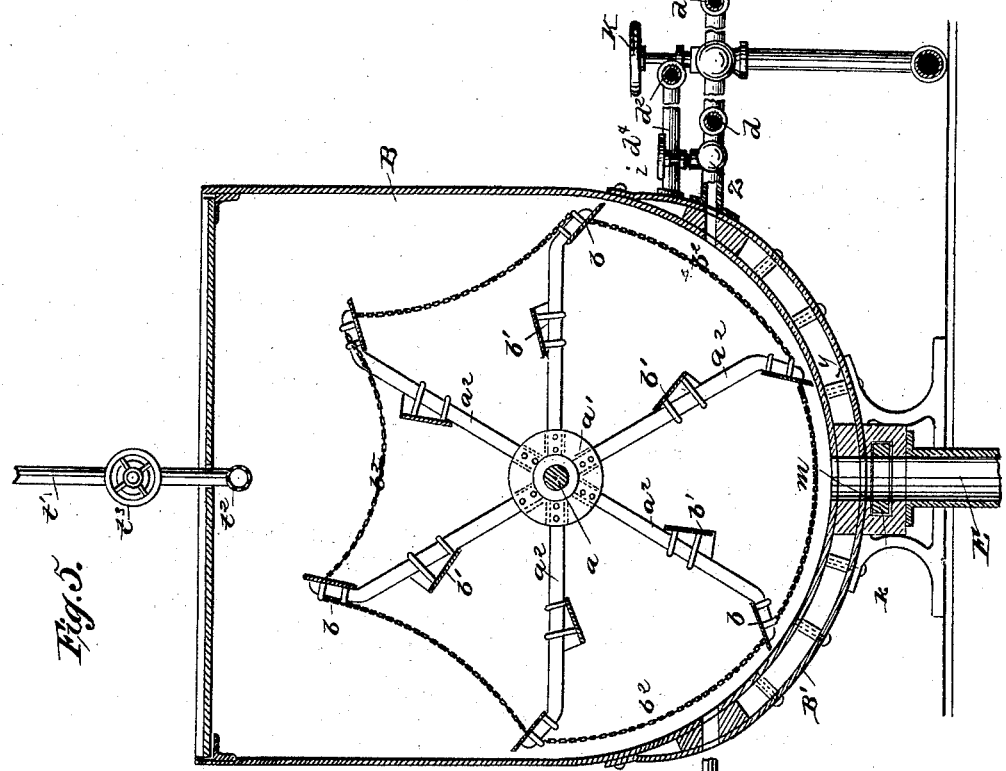
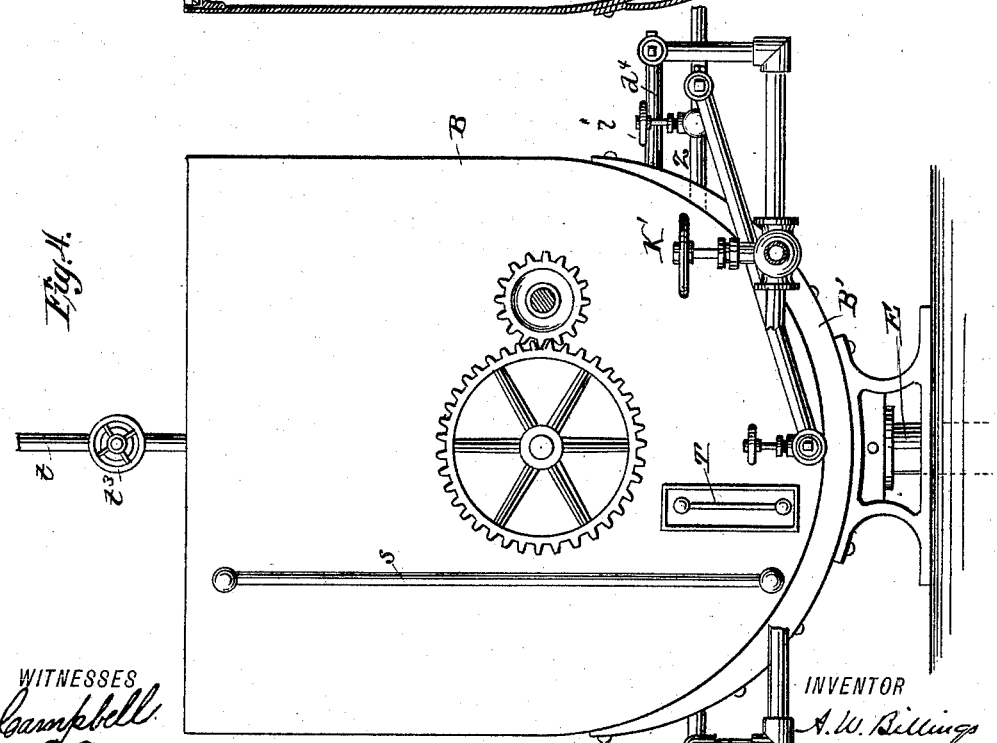
WITNESSES
J. Campbell
Wm J. Fayers.
INVENTOR
A. W. Billings
By his Attorneys
Foster & Freeman
N. PETERS, Photo-Lithographer, Washington, D. C.

UNITED STATES PATENT OFFICE.

ANDREW W. BILLINGS, OF BROOKLYN, NEW YORK.

APPARATUS FOR THE MANUFACTURE OF BEER.

SPECIFICATION forming part of Letters Patent No. 324,523, dated August 18, 1885.

Application filed May 23, 1885. (No model.)

*To all whom it may concern:*

Be it known that I, ANDREW W. BILLINGS, a citizen of the United States, residing at Brooklyn, in the county of Kings and State of New York, have invented certain new and useful Improvements in Apparatus for the Manufacture of Beer, of which the following is a specification.

My invention relates to apparatus for use in the manufacture of beer or ale by an improved process constituting the subject-matter of a separate application for Letters Patent, whereby I am enabled to reduce the quantity of malt and produce a superior article of beer or ale without the use of chemicals or other injurious ingredients, and with but little, if any, increase of time over that required for the ordinary process, and at a great saving in labor and expense.

In carrying out my process I make (preferably at the same time) two mashes, one of malt in the ordinary manner, using the ordinary apparatus, and the other or supplemental mash of corn, rice, or any other kind of raw grain, using apparatus which is illustrated in the accompanying drawings in perspective in Figure 1, in plan in Fig. 2, and in longitudinal section in Fig. 3. Fig. 4 shows an end view, and Fig. 5 is a transverse sectional elevation. The raw grain for the supplemental mash is preferably ground or crushed sufficiently fine for the particles to become thoroughly saturated or wet, and about one bushel of the same, so ground or crushed, is used as an equivalent for from two to three bushels of malt as employed in making the malt-mash, the relative proportions varying with circumstances. The raw grain ground or crushed, as stated, is then put in with the requisite quantity of water at the temperature of about 112° Fahrenheit, the stirrers being in motion. Then by the injection of live steam directly into the mash the mash is heated to about 210°, bringing the mash to a thick pasty condition, care being taken to avoid boiling, (the starch-cells in the raw grain being thoroughly developed,) and then the steam being shut off cold water is injected directly into the mash and its temperature thereby quickly reduced to about 140°, when about four ounces of malt (preferably ground or crushed) to every pound of raw grain used is added and thoroughly mixed through the mash.

The operation is at this stage suspended for from one and one-half to two and one-half hours, so as to allow the diastase, which acts on the starch-cells, to convert the starch into sugar, the mash then losing its pasty condition, after which the stirrers are again set in motion, the mash again heated up to about 185° by the injection of live steam, as before, to complete the development and saccharification of any starch yet unconverted. Then the steam is shut off, the flues opened, and the temperature of the mash reduced to that of the malt-mash, which has meanwhile been prepared, whereupon the two mashes are run together, and the subsequent operations are then pursued as in the ordinary brewing.

In the apparatus shown in the drawings, A is the ordinary mash-tub in general use upon one floor, and B the supplemental mash-tub, preferably in a higher position, being an open tub—that is, with a lid which does not seal the tub. The raw-grain mash is made in the upper tub, the malt-mash in the lower, and at the proper time the upper mash is transferred to the lower.

The tub B is preferably of iron, with a curved bottom, and with an outer jacket, B', forming a steam-chamber, $y$. The tub B, Fig. 2, is crossed by a shaft, $a$, carrying hubs $a'$, from which radiate arms $a''$, supporting stirrer-blades $b\ b'$, which serve to keep the mash in agitation. The steam is injected from a steam-pipe, $d$, Fig. 5, through pipes or nozzles $z$ at the sides and ends, so as to be brought in direct contact with the whole body of the mash at once, a valve, $k$, controlling the flow of steam to all the nozzles, and the stirrers are rotated, so as to aid in carrying the steam downward from the inlet-pipes into and through the body of the mash. Each branch $z$ is provided with a valve, $i$, Fig. 4, arranged as close to the side of the tub as possible, so as to have no room for a deposit, which would close the opening, and the angles of the steam-pipe $d$ are provided with suitable caps or plugs, $s$, Fig. 2, so arranged that they are readily removed and afford complete access to the pipes for the purpose of removing any obstruction or thoroughly cleaning, when necessary. The discharge-valve $k$, Fig. 3, at the outlet $m$ is arranged close to the tub. A lever, D, operates the valve $k$, and a pipe, E, conducts the mash from the tub B to the tub A.

Thermometers T are arranged at suitable points in the tub B, to enable the temperature of the mash to be ascertained and properly regulated. The injection of the live steam directly in the mash not only quickly heats it, but aids to maintain it in agitation, prevents its baking to the tub, and effects the requisite changes more promptly and with better results than when steam pipes or casings are employed.

The steam chamber $y$, Fig. 3, is supplied with steam through a pipe, $d''$, Fig. 2, provided with branches $d^4$, a cock, $k'$, controlling the flow of steam to all the branches. This jacket is auxiliary to the live steam injected directly into the mash, and aids in regulating the temperature and in rapid heating of the mash, which is so essential in carrying out my improved process.

The blades $b$ are set to move as near the bottom of the tub as possible, and at an angle to the supporting-arms, so as to tend to lift the material from the bottom, prevent it baking thereon, and throw it toward the center of the tub, thereby overcoming the tendency, when the agitator is revolving at a high speed, to throw the mash out of the tub. The inner blades, $b'$, Fig. 5, are set in the opposite direction to the blades $b$, thereby creating counter-currents, which aid in thoroughly mixing the mash.

To further agitate the mash and thoroughly cleanse the bottom of the tank, I suspend chains $b''$ between the blades $b$, as shown, these chains scraping the bottom and breaking up the material.

The even distribution and proper temperature of the water thrown into the mash is secured by the use of a perforated distributing-pipe, $t^2$, Fig. 3, arranged beneath the cover or lid $w$, and communicating with the cold-water pipe $t$ and hot-water pipe $t''$, each pipe $t'$ $t$ having a cock, $t^3$, so that either cold or hot water, or water of any desired temperature, may be thrown evenly over the surface of the mash. This even distribution is important, as the sudden injection of water at one or more isolated points only would effect only part of the work and lead to deleterious changes.

I do not claim stirring-blades set at an angle to the arms, as this is old; but the combination of angular blades with a heating-jacket serves to lift the material which is baked upon the bottom by the heat of the jacket.

I do not here claim the process described, but claim—

1. The combination, with the usual open mash-tub, A, of a supplemental mash-tub adapted to hold supplemental mash, and provided with agitators and steam and cold-water pipes, both communicating with the interior of the supplemental tub, whereby to agitate and, by injecting the steam and cold water, to alternately heat and cool said supplemental mash, and with conduit to the tub A, substantially as set forth.

2. The combination of the tub, agitator, steam inlet-pipes, and perforated pipe $t^2$, and cold and hot water tubes $t'$ $t$, connecting with the pipe $t^2$, and provided with cocks, substantially as described.

In testimony whereof I have signed my name to this specification in the presence of two subscribing witnesses.

ANDREW W. BILLINGS.

Witnesses:
HENRY H. SPELMAN,
HENRY MAJOR.